(12) United States Patent
Kim et al.

(10) Patent No.: US 10,275,158 B2
(45) Date of Patent: Apr. 30, 2019

(54) APPARATUS AND METHOD FOR IMPROVING OPERATION SPEED OF APPLICATION

(71) Applicant: Samsung Electronics Co., Ltd., Suwon-si, Gyeonggi-do (KR)

(72) Inventors: Kwonsik Kim, Suwon-si (KR); Hyojeong Lee, Suwon-si (KR); Seyoun Lim, Seoul (KR); Sangbok Han, Suwon-si (KR); Myungsun Kim, Seongnam-si (KR); Jongchul Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/682,427

(22) Filed: Apr. 9, 2015

(65) Prior Publication Data

US 2015/0293701 A1 Oct. 15, 2015

(30) Foreign Application Priority Data

Apr. 9, 2014 (KR) .................. 10-2014-0042567
Aug. 11, 2014 (KR) .................. 10-2014-0103866

(51) Int. Cl.

| G06F 3/00 | (2006.01) |
|---|---|
| G06F 3/06 | (2006.01) |
| G06F 13/14 | (2006.01) |
| G06F 9/445 | (2018.01) |
| G06F 12/121 | (2016.01) |

(52) U.S. Cl.
CPC .............. *G06F 3/061* (2013.01); *G06F 3/065* (2013.01); *G06F 3/0619* (2013.01); *G06F 3/0652* (2013.01); *G06F 3/0659* (2013.01); *G06F 3/0673* (2013.01); *G06F 9/445* (2013.01); *G06F 9/44505* (2013.01); *G06F 12/121* (2013.01); *G06F 13/14* (2013.01); *G06F 2003/0692* (2013.01); *G06F 2212/70* (2013.01)

(58) Field of Classification Search
CPC .................................. G06F 3/00; G06F 12/08
See application file for complete search history.

(56) References Cited

U.S. PATENT DOCUMENTS

| 6,003,115 A | 12/1999 | Spear et al. |
| 2005/0108496 A1 | 5/2005 | Elnozahy et al. |
| 2007/0043939 A1 | 2/2007 | Fallon et al. |

(Continued)

OTHER PUBLICATIONS

Joo et al.; Improving Application Launch Performance on Solid State Drives; Journal of Computer Science and Technology; Kluwer Academic Publishers; BO, vol. 27, No. 4; Jul. 12, 2012; CN.

(Continued)

*Primary Examiner* — David E Martinez
(74) *Attorney, Agent, or Firm* — Jefferson IP Law, LLP

(57) ABSTRACT

An application execution method for improving the operation speed of the application in executing or in the middle of running the application is provided. The application execution method includes detecting a launch of an application, preloading Input/Outputs (I/Os) requested at the launch based on profile data with I/Os requested at a previous launch of the application, and updating the profile data based on at least one of the I/Os requested at current and previous launches of the application.

16 Claims, 15 Drawing Sheets

(56) References Cited

U.S. PATENT DOCUMENTS

2013/0066832 A1\* 3/2013 Sheehan ................ G06Q 10/00
                                                      707/634
2013/0332811 A1   12/2013 Chang et al.
2014/0040563 A1    2/2014 Lee et al.

OTHER PUBLICATIONS

Ohta Ketal: "Optimization Techniques at the 1/0 Forwarding Layer", Cluster Computing (Cluster), 2010 IEEE International Conference on, IEEE, Piscataway, NJ, USA, Sep. 20, 2010, pp. 312-321, XP031774297, ISBN: 978-1-4244-8373-0.

\* cited by examiner

APPARATUS AND METHOD FOR IMPROVING OPERATION SPEED OF APPLICATION

CROSS-REFERENCE TO RELATED APPLICATION(S)

This application claims the benefit under 35 U.S.C. § 119(a) of a Korean patent application filed on Apr. 9, 2014 in the Korean Intellectual Property Office and assigned Serial No. 10-2014-0042567, and of a Korean patent application filed on Aug. 11, 2014 in the Korean Intellectual Property Office and assigned Serial No. 10-2014-0103866, the entire disclosure of each of which is hereby incorporated by reference.

TECHNICAL FIELD

The present disclosure relates to an application execution method and apparatus of a terminal. More particularly, the present disclosure relates to a technology of improving the operation speed of the application in executing or in the middle of running the application.

BACKGROUND

Typically, when a terminal initially launches an application, the Central Processing Unit (CPU) of the terminal loads the requested input/output (I/O) data on the main memory device, such as a Random Access Memory (RAM), from an auxiliary memory device, such as Hard Disk Drive (HDD) until the application execution screen is displayed. Since there is no I/O data preloaded at the initial launch of the application, it takes a relatively long time to launch the application. In the case of re-launching the application, it is possible to load the I/O data necessary for launching the application using the I/O lists used in the previous launching process, resulting in a reduction of loading time. Even in this case, however, the total length of the loading time may vary depending on the method of updating the I/O lists that have been loaded in the previous launching process.

In order to improve the running speed of the application after it has been launched, it may be considered, even when a virtual-physical memory unmapping (unmap( )) request is input, to store the mapping information between the virtual memory and the physical memory in the reuse pool for a predetermined duration other than returning the mapping information. In this case, however, there may be a need of an appropriate reuse pool management method for determining the amount of the memory mapping information to be stored in the reuse pool and how to remove the memory mapping information.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for improving the running speed of an application on a terminal in the launching stage and post-launching stage.

In accordance with an aspect of the present disclosure, an application execution method of a terminal is provided. The application execution method includes detecting a launch of an application, preloading Input/Outputs (I/Os) requested at the launch based on profile data with I/Os requested at a previous launch of the application, and updating the profile data based on at least one of the I/Os requested at current and previous launches of the application.

In accordance with another aspect of the present disclosure, a terminal for executing an application is provided. The terminal includes a storage unit configured to store profile data including a list of I/Os requested at a previous launch of the application and a control unit configured to detect a launch of an application, preload I/Os requested at the launch based on profile data with I/Os requested at the previous launch of the application, and update the profile data based on at least one of the I/Os requested at current and previous launches of the application.

In accordance with another aspect of the present disclosure, an application execution method of a terminal is provided. The application execution method includes detecting a memory return request of a process executed by the application, storing memory mapping information of the process in response to the memory return request, determining whether a total amount of the memory mapping information stored in the memory mapping storage is greater than a predetermined capacity, and releasing, when the total amount of the memory mapping information is greater than the predetermined capacity, a connection between a virtual memory and a physical memory which is associated with at least one memory mapping information in units of page.

In accordance with another aspect of the present disclosure, a terminal for executing an application is provided. The terminal includes a physical memory unit configured to store data, an input unit configured to receive an input to generate a request signal of the application, a virtual memory unit configured to map the data stored in the physical memory unit, a memory mapping storage configured to detect a memory return request of a process executed by the application and stores the memory mapping information of the process in response to the memory return request, and a control unit configured to determine whether a total amount of the memory mapping information stored in the memory mapping storage is greater than a predetermined capacity and release, when the total amount of the memory mapping information is greater than the predetermined capacity, a connection between the virtual memory unit and the physical memory which is associated with at least one memory mapping information in units of page.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
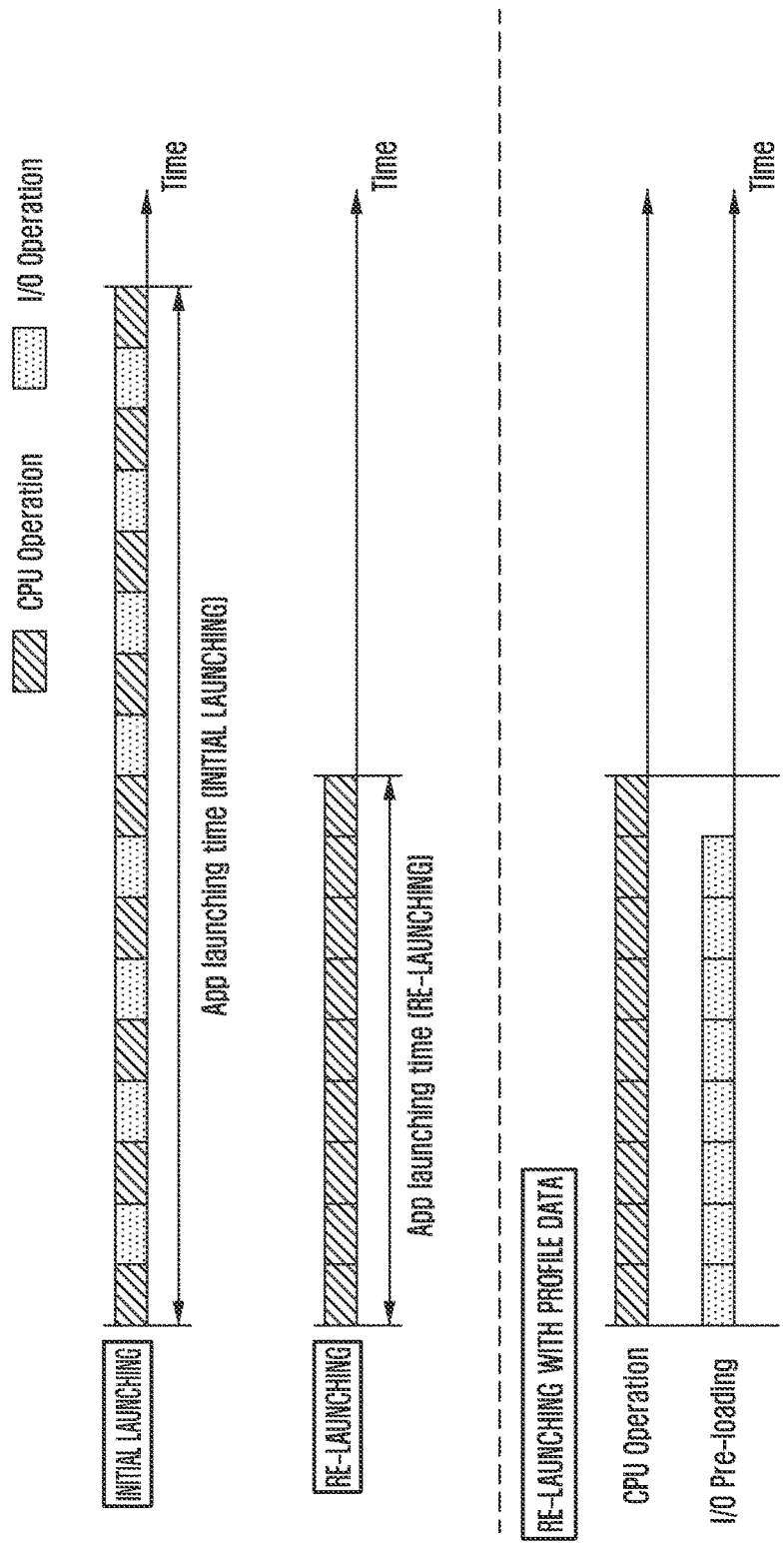
FIG. 1 is a diagram illustrating an application launching mechanism according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the terminal may be a device having a Central Processing Unit (CPU) and a storage unit as follows. Examples of the terminal may include a smartphone, a tablet Personal Computer (PC), a mobile phone, a video phone, an electronic book (ebook) reader, a desktop PC, a laptop PC, an netbook computer, a Personal Digital Assistant (PDA), a Portable Multimedia Player (PMP), an Moving Picture Experts Group (MPEG-1 or MPEG-2) Audio Layer 3 (MP3) player, a mobile medical device, a camera, and a wearable device (e.g. electronic glasses and head-mounted-device (HMD), an electronic clothing, an electronic bracelet, an electronic necklace, an electronic appcessory, an electronic tattoo, a smart watch).

In the following description, the terminal may be a smart home appliance having a CPU and a storage unit. Examples of the smart home appliance may include a television (TV), a Digital Versatile Disc (DVD) player, an audio, a refrigerator, an air conditioner, a vacuum cleaner, an oven, a microwave oven, a laundry machine, an air purifier, a set-top box, a TV box (e.g. Samsung HomeSync™, Apple TV™, and Google TV™), a game console, an electronic dictionary, an electronic key, a camcorder, and an electronic frame.

In the following description, examples of the terminal may include a medical device (e.g. Magnetic Resonance Angiography (MRA), Magnetic Resonance Imaging (MRI), Computed Tomography (CT), camcorder, microwave scanner, etc.) a navigation device, a Global Positioning System (GPS) receiver, an Event Data Recorder (EDR), a Flight Data Recorder (FDR), an automotive infotainment device, a marine electronic equipment (e.g. marine navigation system, gyro compass, etc.), aviation electronics (avionics), an automotive head unit, an industrial or household robot, an Automatic Teller Machine (ATM), and a Point Of Sales (POS) terminal.

In the following description, the term 'input/output (I/O)' is used to denote an operation, a program, or a device of exchanging data with a computer.

In the following description, the terms 'application' and 'APP' are interchangeable used to denote an application program running on the terminal for convenience sake.

In the following description, the term 'auxiliary memory' such as Hard Disk Drive (HDD) and flash memory is interchangeably used with the term 'first memory,' and the term 'main memory' such as Random Access Memory (RAM) and Cache memory is interchangeably used with the term 'second memory' for convenience sake.

FIG. 1 is a diagram illustrating an application launching mechanism according to an embodiment of the present disclosure.

Referring to FIG. 1, the operations performed in launching an application may be categorized into CPU operations and I/O operations.

The CPU operations denote the tasks of performing various computations with data, and the I/O operations denote the tasks of loading the data of files necessary for launching an application from the auxiliary memory such as HDD and flash memory to the high speed main memory such as RAM and Cache memory.

Since files or data necessary for launching an application are not known at the initial launch of the application, the CPU operation and I/O operation may be performed alternately as shown in FIG. 1. That is, if a specific file or data is required while a CPU operation is running, the I/O operation is executed and then the CPU operation is executed again, repeatedly.

Since the I/O operation and CPU operation are not performed simultaneously at the initial launch of the application, the launch speed is likely to be slow However, it is possible for the terminal to store the I/O list requested at its first launch of the application as profile data, determine, when the application is re-launched afterward, whether the profile data exists, and, if so, pre-load the I/O stored in the list of the corresponding data before the CPU operation request for the corresponding I/O. In this case, if there is a request for the application, the application can be launched quickly as compared to the initial launch.

Referring to FIG. 1, since the CPU operation and the I/O operation are executed as separate processes simultaneously, it gives an effect as if the time taken for executing the CPU operation is the total time taken for launching the application.

However, in order for the time taken for executing the CPU operation to be equal to the application launching time, the I/O operations required for the launch of the application have to be preloaded.

Figure 2:
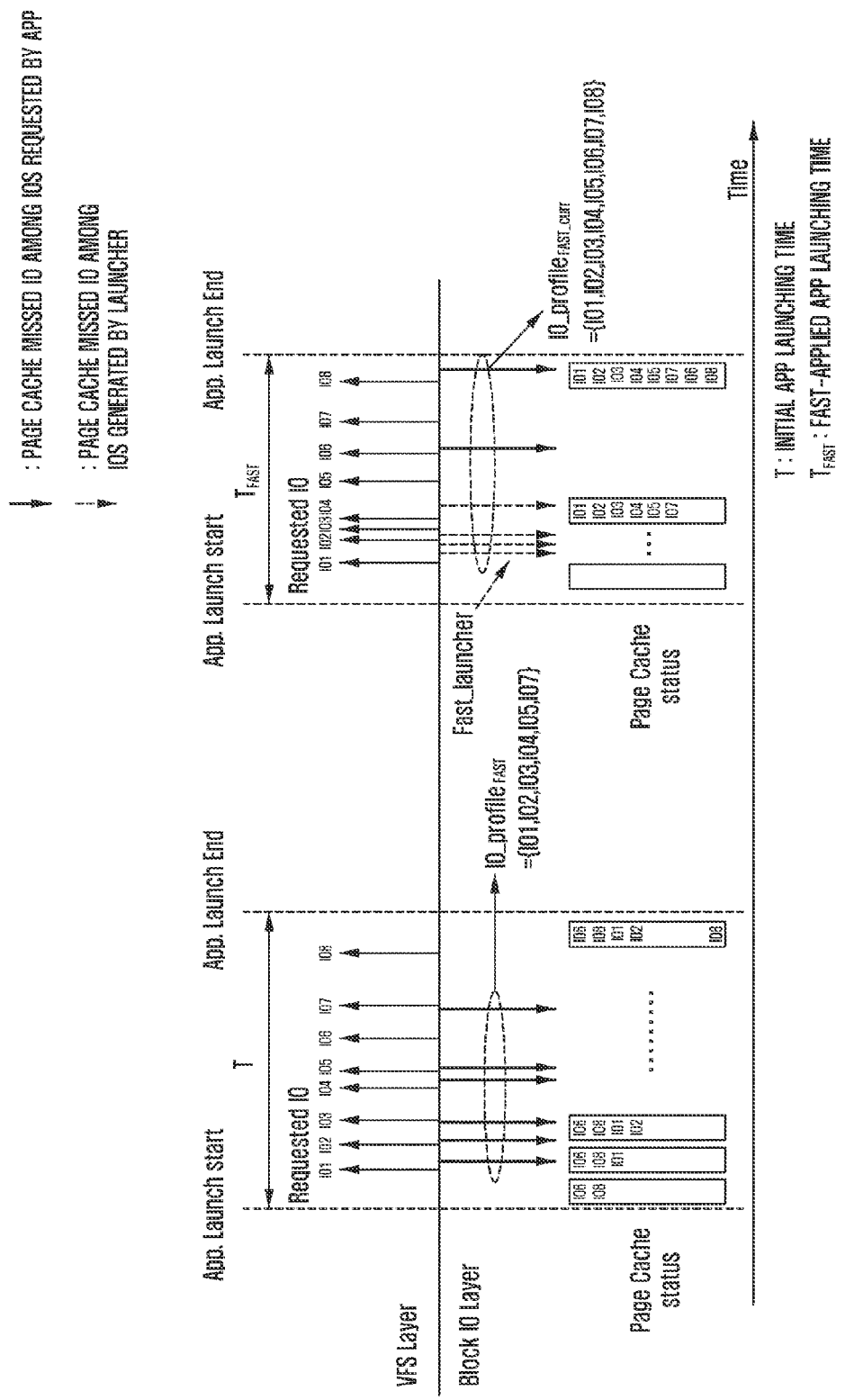
FIG. 2 is a diagram illustrating a profiling process on a block input/output (I/O) layer according to an embodiment of the present disclosure.

FIG. 2 is a diagram illustrating a profiling process on a block I/O layer according to an embodiment of the present disclosure.

Referring to FIG. 2, there are a plurality of I/Os (i.e., IO1, IO2, IO3, IO4, IO5, IO6, IO7, and IO8) between the launch start and launch end times of an application at its initial launch. These I/Os may include I/Os not related to the launch of the corresponding application as well as the I/Os related to the launch of the application.

The block I/O layer may be a layer which shows the loading state as a page block. With the exception of the I/Os loaded already among the requested I/Os, the block I/O layer profiles only the I/Os that are not cached, i.e. should be loaded. In FIG. 2, the block I/O layer profiles IO1, IO2, IO3, IO4, IO5, and IO7, with the exception of IO6 and IO8 which have been loaded already, and stores these I/Os as profile data. Since the IO6 and IO8 are not preloaded at the re-launching state afterward, it is impossible to load all of the I/Os required for launching the application as shown in FIG. 1.

The Virtual File System (VFS) layer is a virtual layer interposed between the file system and the user Take. If the VFS (instead of the block I/O layer) is responsible for profiling the requested I/Os, it is possible to profile all of the I/Os (IO1, IO2, IO3, IO4, IO5, IO6, IO7, and IO8) and store the I/Os as profile data. Accordingly, the I/Os stored in the list of the I/Os requested are IO1, IO2, IO3, IO4, IO5, and IO7, which can be pre-fetched (Fast_launcher). Even in this case, however, not all of the requested I/Os may be related to the launch of the corresponding application. For example, if IO6 and IO8 are not related to the launch of the application, this means that unnecessary I/Os are preloaded. In order to prevent the unnecessary profile data from being generated, it can be considered to update the profile data whenever the application is launched. That is, this method compares the profile data and the requested I/Os at every launch of the application to regard only common I/Os as the I/Os necessary for launching the application and to update the profile data. This can be expressed as Equation 1.

$$IO\_profile_{FAST} = IO\_profile_{FAST} \cap IO\_profile_{FAST\_curr} \quad \text{Equation 1}$$

However, even this profile data update method has a drawback in that, since only the common I/Os are stored at every occasion, the I/Os related to the launch of the application may be omitted as the launch repeats, thus accomplishing the object of improvement of the application launching speed is still difficult although not generating unnecessary profile data.

Figure 3:
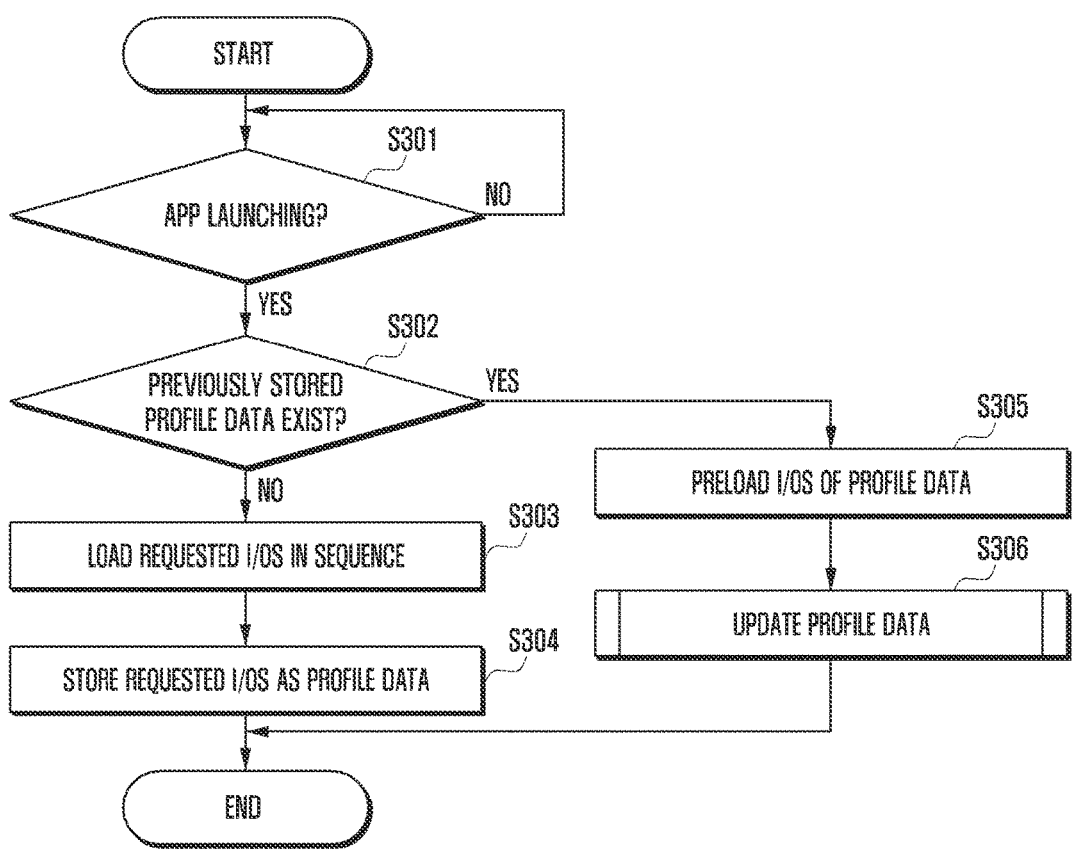
FIG. 3 is a flowchart illustrating an application launching speed enhancement method according to an embodiment of the present disclosure.

FIG. 3 is a flowchart illustrating an application launching speed enhancement method according to an embodiment of the present disclosure.

Referring to FIG. 3, the terminal determines whether an application launch request is detected at operation S301. The terminal monitors until the application launch request is detected.

If the application launch request is detected, the terminal determines whether there are profile data stored previously at operation S302.

If there are no profile data stored previously, this means that the launch of the application is the initial launch and thus the User Equipment (UE) loads the requested I/Os in sequence in the order as requested at operation S303. Accordingly, the launching time may be computed as the initial launching time of FIG. 1.

After loading the requested I/Os, the UE stores a list of the requested I/Os as profile data at operation S304.

If there are the profile data stored previously at operation S302, the terminal executes an I/O operation process in separation of the CPU operation to preload the I/Os included in the profile data at operation S305. Accordingly, the application launching time is shortened as described with reference to FIG. 1.

The terminal updates the profile data stored previously at operation S306. The profile update procedure is described in detail with reference to FIG. 5 later.

Figure 4:
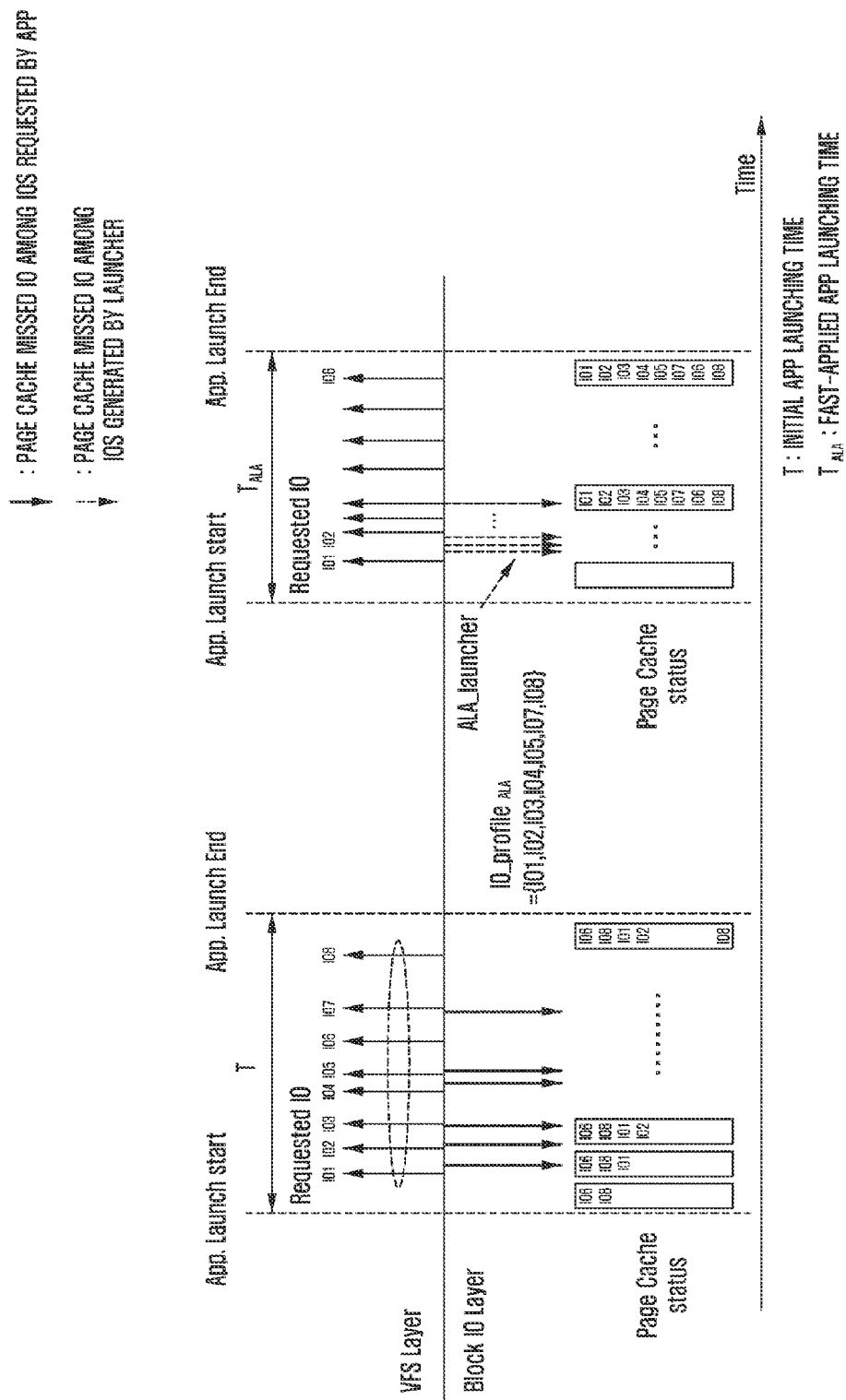
FIG. 4 is a diagram illustrating an application launching procedure to which an application launching speed enhancement method is applied according to an embodiment of the present disclosure.

FIG. 4 is a diagram illustrating an application launching procedure to which an application launching speed enhancement method is applied according to an embodiment of the present disclosure.

Throughout the specification and drawings, the application launching speed enhancement method is interchangeably referred to as Application Launching Accelerator (ALA).

Referring to FIG. 4, since the VFS layer performs profiling, the I/Os requested at the initial launching of the application (i.e., IO1, IO2, IO3, IO4, IO5, IO6, IO7, and IO8) are all stored as profile data so as to be all preloaded in the re-launching procedure afterward, thereby shortening the application launching time according to the ALA of the present disclosure.

The application launching speed enhancement method may include a scheme of discerning the I/O lists regardless of the launch of the application as well as the scheme of data profiling at the VFS layer. In the case that there is an I/O which does not exist in the profile data but is requested in preloading the I/Os, the UE may determine whether to merge the I/Os. The scheme of discerning the I/O lists that are not related to the application launch is described with reference to FIGS. 5 to 7.

Figure 5:
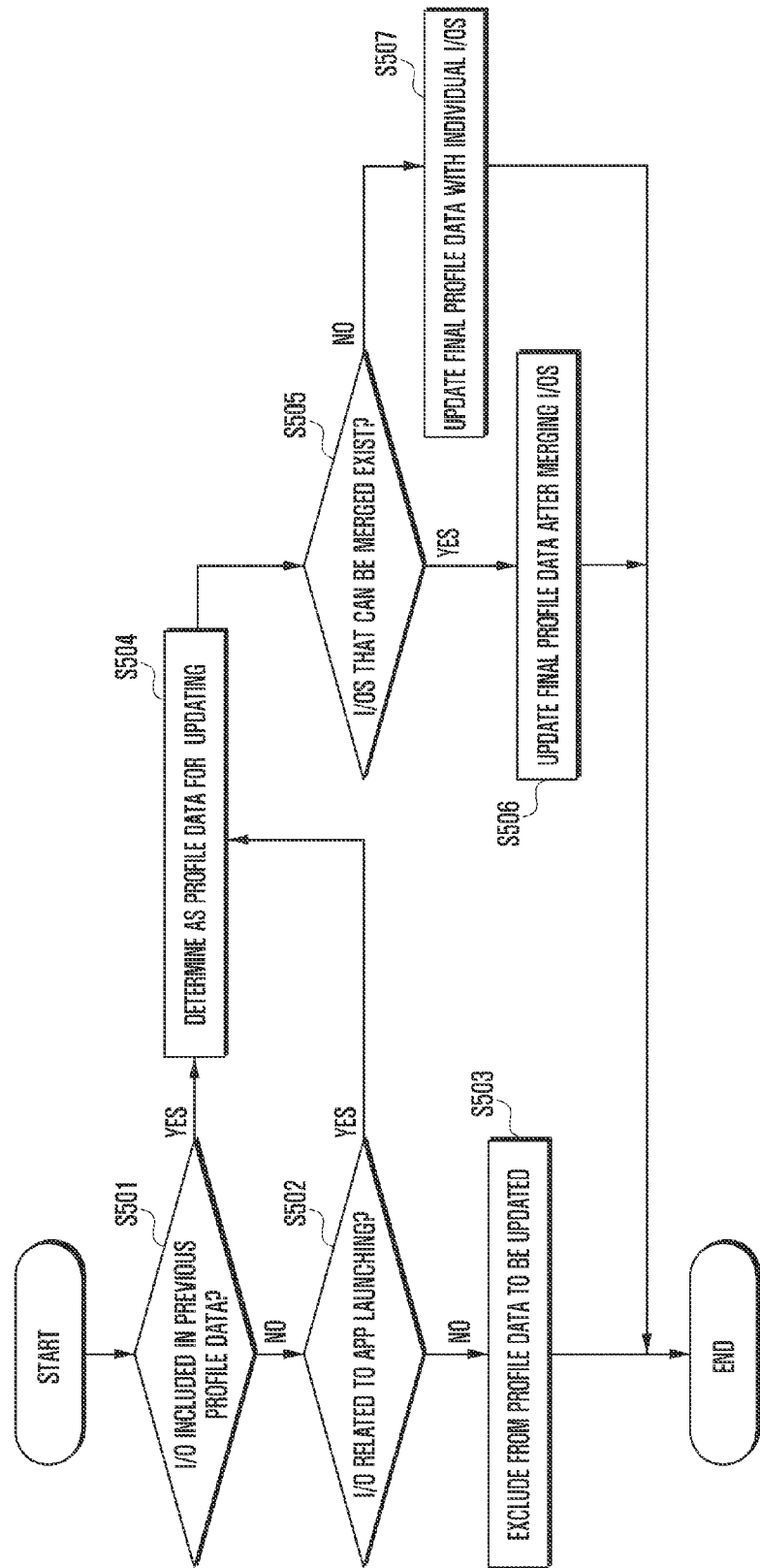
FIG. 5 is a flowchart illustrating a profile data update method according to an embodiment of the present disclosure.

FIG. 5 is a flowchart illustrating a profile data update method according to an embodiment of the present disclosure.

Referring to FIG. 5, the terminal determines whether the requested I/O exists in the previously stored profile list at operation S501. Although the I/O does not exist in the previous profile list, the VFS layer performs profiling to add the I/O to the profile list. Accordingly, the I/Os profiled in the application launching procedure include all requested I/Os including the I/Os of the previous profile data and thus there is a need of criteria for determining whether all of the I/Os are entitled to be stored in the profile list.

In the present disclosure, the terminal first extracts I/Os that are not included in the previous profile data too as well as the common I/Os in comparison with the previous profile data in order to extract all the I/Os requested at the application launching state to determine whether the I/Os are related to the application launching. This can be expressed as Equation 2.

$$REQIO\_profile_{ALA} = (ReqIO\_profile_{ALA\_prev} \cap (REQ-IO\_profile_{ALA\_curr})) \cup ((ReqIO\_profile_{ALA\_prev} \cap (ReqIO\_profile_{ALA\_curr})) XOR \ ReqIO\_profile_{ALA\_curr})$$

Equation 2

If the I/O exists in the previous profile data at operation S501, this I/O is likely to be related to the application launching and, otherwise, unlikely to be related to the application launching.

The terminal determines whether the requested I/O is related to the application launching at operation S502. In the present disclosure, Inter-Process Communication (IPC) may be used to determine whether the requested I/O is related to the application launching.

In more detail, the IPC is a mechanism that allows exchange of messages between applications running on a system and, if IPC occurs between the requested I/Os occurring at the application launch start time (App Launch start), this means that the corresponding I/Os are related to the application lunching. Accordingly, the terminal discerns the I/O related to the application launching depending on whether IPC occurs between the I/Os at operation S502.

If it is determined that the I/O is not related to the application launching due to no IPC, this means no necessity of storing it in the profile data and thus the terminal excludes the I/O when storing the profile data newly at operation S503.

At operation S504, the terminal determines the I/Os on the previous profile data and the I/Os added newly in association with the application launching as the profile data for updating the merged I/O list depending on the determination results at operations S501 and S502.

At operation S505, the terminal determines whether there are I/Os that can be merged among the targets determined for update at operation S504. For example, an I/O which reads data several times from the same file at the application launching operation may occur. In the case that such I/Os occur adjacently, if the I/O reads the corresponding file at a time, it is possible to reduce the loading time. Accordingly, if there are files which are the same in file name, offset, and length among them read by the I/O operation and thus if it is possible to read all the data at a time by marching the corresponding I/Os, the terminal merges the I/Os.

In the case of applying this to all the I/Os, the order of I/Os may change so as to cause performance degradation, it may be applied to I/Os in a predetermined range. Here, the predetermined range may be based on the I/O processing time or in detail, the time window as a predetermined time unit for determining whether to merge the I/Os.

If there are I/Os that can be merged, the terminal merges the corresponding I/Os into one to update the final profile data at operation S506.

If there is no I/O that can be merged, the terminal updates the final profile data with individual I/Os at operation S507.

Figure 6:
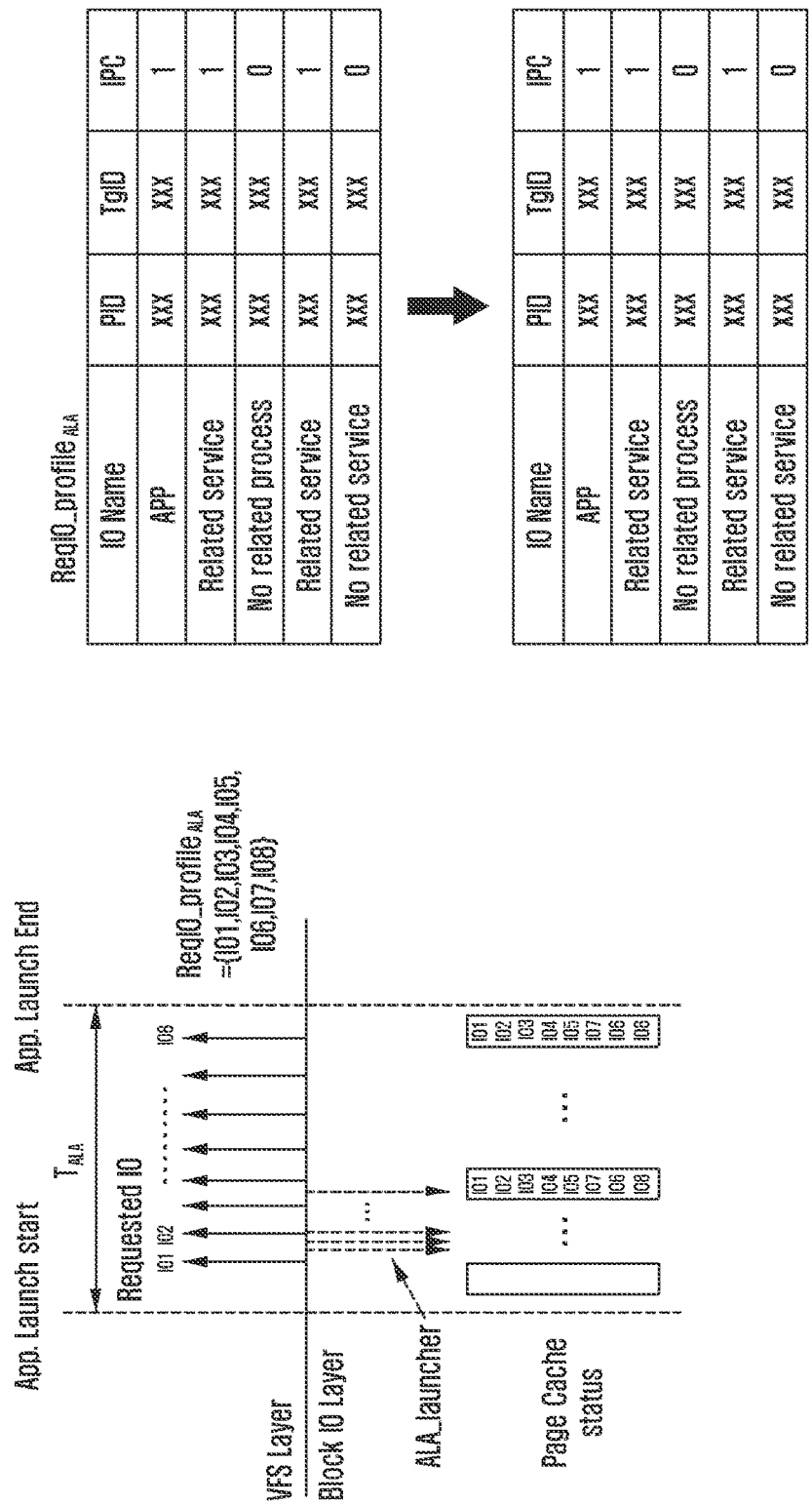
FIG. 6 is a diagram for explaining an application launching-related I/Os checking process of a profile data update method according to an embodiment of the present disclosure.

FIG. 6 is a diagram for explaining an application launching-related I/Os checking process of a profile data update method according to an embodiment of the present disclosure.

Referring to FIG. 6, whether the I/O requested at the application launching operation is related to the application launching may be determined based on whether IPC occurs.

In more detail, the IPC is a mechanism that allows exchange of messages between applications running on a system and, if IPC occurs between the requested I/Os occurring at the application launch start time (App Launch start), this means that the corresponding I/Os are related to the application launching. If the process generating the I/O is related to the currently running process, IPC occurs. If IPC occurs, the IPC value is set to 1 and, otherwise, 0.

The terminal checks the I/O list to determine whether IPC occurs. If the IPC occurs, the terminal determines that the corresponding I/O is related to the application launching and, otherwise if no IPC occurs, that the I/O is not related to the application launching. In this way, the profile update method according to an embodiment of the present disclosure is capable of checking the I/Os related to the application launching among the I/Os increasing in number due to the profiling on the VFS layer.

Figure 7:
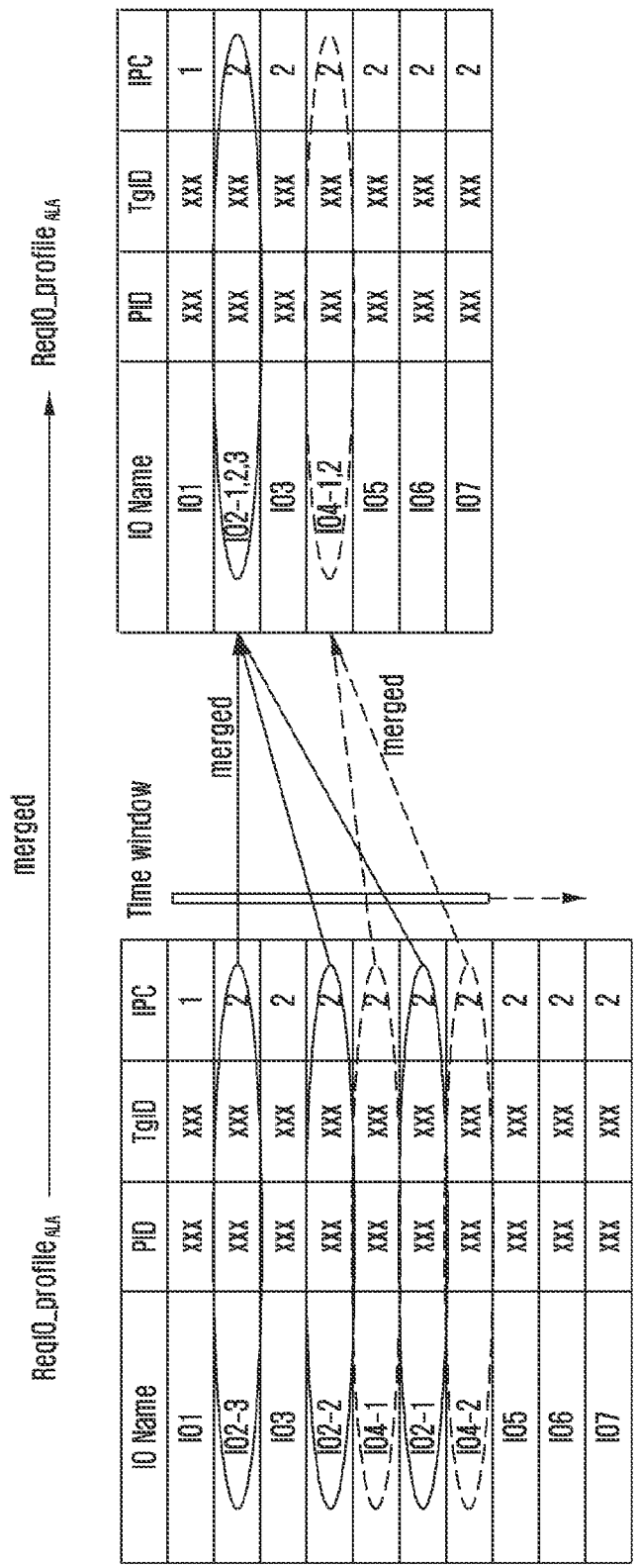
FIG. 7 is a diagram for explaining an I/O merging process of a profile data update method according to an embodiment of the present disclosure.

FIG. 7 is a diagram for explaining an I/O merging process of a profile data update method according to an embodiment of the present disclosure.

Referring to FIG. 7, if the I/O list to be updated is determined (see operation S504 of FIG. 5), the UE determines whether there are I/Os that can be merged in the I/O lists.

The I/O operation occurring at the application launching state may call for data as part of a specific file. If one I/O can load the data of the same file, it is possible to reduce the preloading time as much as the merged time.

Whether the I/Os can be merged may be determined based on the following criteria. The I/Os to be merged are associated with the same file and have to be overlapped in length with the offset of the file of the I/Os. It is not necessary for offset required for the merging I/Os to be continuous completely. In the case that the I/Os to be merged are distant, merging may cause performance degradation.

Referring to FIG. 7, IO2-3, IO2-2, IO2-1, I04-1, and I04-2 and I/Os that can be merged. These I/Os can be merged because they are in the allowable range as well as being associated with the called file, offset, and length. That is, if the IO2-3, IO2-2, IO2-1, I04-1, and I04-2 can be read by the same I/O, the preloading time decreases so as to reduce the I/O operation delay. In the case of merging the all profile data, however, the I/O order may change, resulting in degradation of preloading performance itself. Accordingly, it is preferred to merge the I/Os that are in a predetermined range, which is referred to as 'Time Window' herein.

Figure 8:
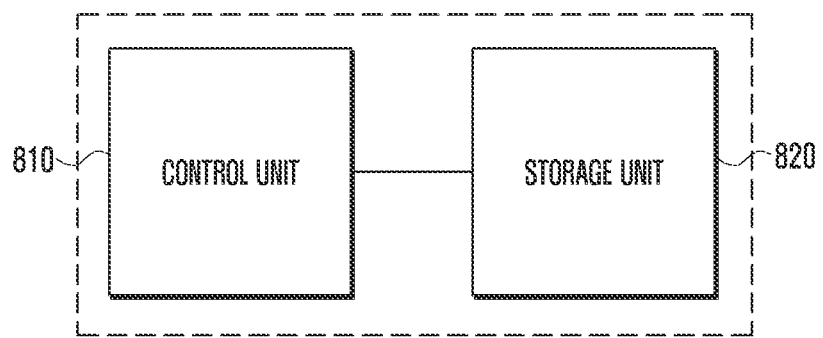
FIG. 8 is a block diagram illustrating an application launching speed enhancement apparatus according to an embodiment of the present disclosure.

FIG. 8 is a block diagram illustrating an application launching speed enhancement apparatus according to an embodiment of the present disclosure.

Referring to FIG. 8, the application launching speed enhancement apparatus according to an embodiment of the present disclosure includes a control unit 810 and the storage unit 820.

The storage unit 820 may store the profile data including a list of I/Os requested at the previous launch of the application.

The control unit 810 detects the launch of the application, preloads the I/Os requested at the previous launch based on the profile data, and updates the profile data based on at least one of the I/Os requested at the current launch of the application and the I/Os requested at the previous launch.

The control unit 810 determines whether the I/Os requested at the current launch of the application exist in the profile data and, if not, adds the I/Os to the profile data to be updated.

The control unit 810 also determines whether the I/O requested at the launch of the application is related to the launch of the application.

Whether the I/O requested at the launch of the application is related to the launch of the application is determined based on whether IPC occurs between the I/O requested at the launch of the application and the I/Os stored in the profile data.

The control unit 810 also may detect the previous launch of the application, preload the I/Os requested at the previous launch based on the profile data, and update the profile data based on at least one of the I/Os requested at the current launch of the application and the I/Os request at the previous launch.

The control unit 810 may determine the I/Os to be included in the profile data and merge the I/Os that can be merged among the I/Os to be included in the profile data.

The control unit 810 also may detect I/Os associated with the same file among the I/Os to be included in the profile data, determine whether the I/Os associated with the same file are in the predetermined time window, and, if so, merge the I/Os associated with the same file.

The application launching speed enhancement apparatus of the present disclosure has been described with reference to FIG. 8. Although the description has been made of the separate control unit 810 and storage unit 820, it is obvious to those in the art that the function blocks may be subdivided into a plurality of modules or merged into at least one module.

A description is made of the application execution speed enhancement method and apparatus after the launch of the application hereinafter.

After being launched, the application may read and/or write a plurality of data and performs operations using the physical and virtual memories.

Figure 9:
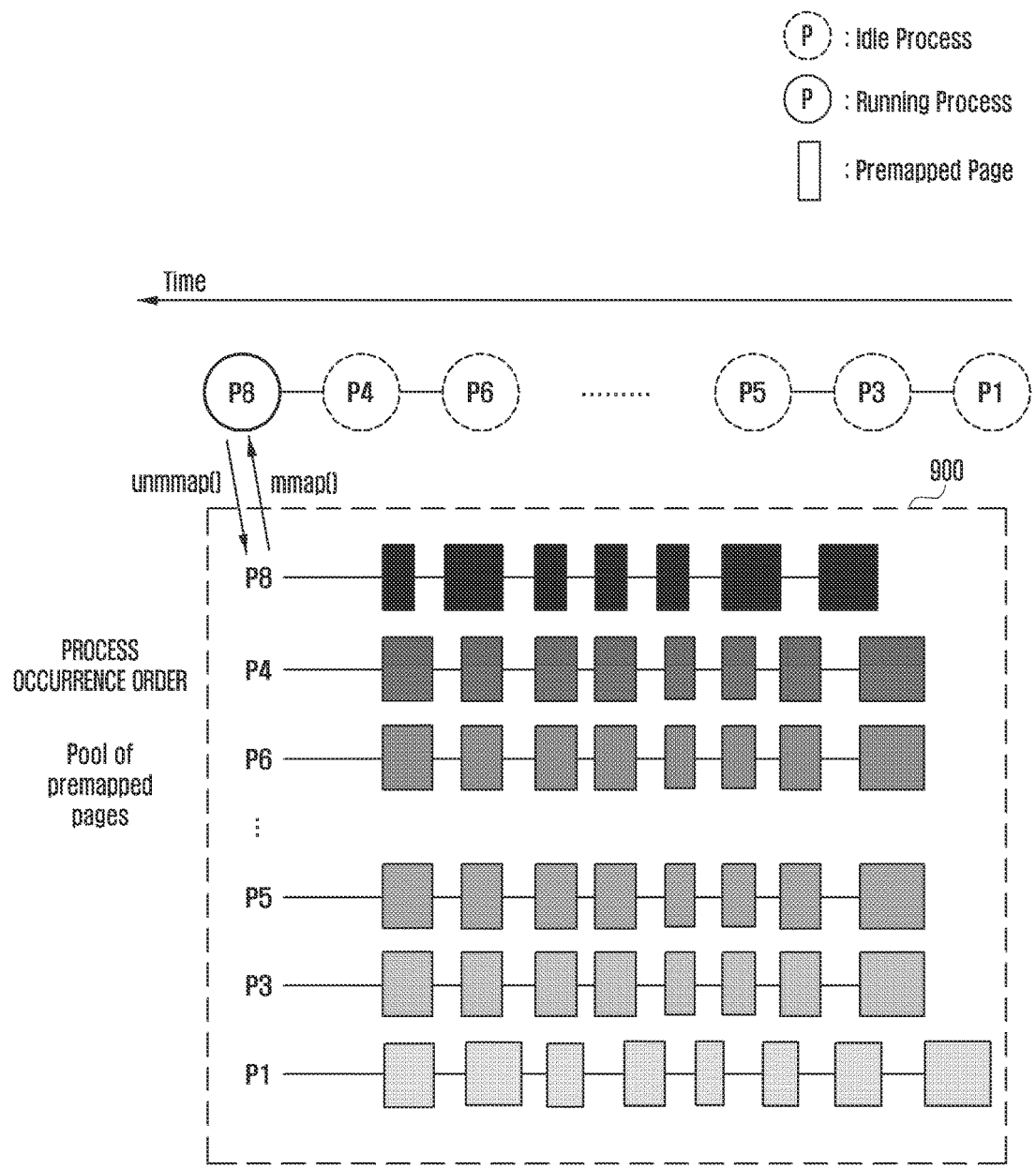
FIG. 9 is a diagram illustrating a memory mapping storage unit for managing memory mapping information of an application according to an embodiment of the present disclosure.

FIG. 9 is a diagram illustrating a memory mapping storage unit for managing memory mapping information of an application according to an embodiment of the present disclosure.

After an application is executed, the processes responsible for various functions are executed in association with the corresponding application. Each process can access the memory to read and write data in the Virtual Memory Access mode in which the data stored in the physical memory are mapped to the virtual memory.

After use of a specific virtual memory, the process returns the virtual memory back to the system (unmap) such that the connection between the virtual memory and the physical memory is released. However, if releasing the connection between the virtual and physical memories whenever the process requests for return (unmap) of the virtual memory, the system has to repeat the same operation (connection between virtual and physical memories) when same process requests for new virtual memory, resulting in reduction of efficiency.

According to an embodiment of the present disclosure, a terminal may regard the un-mapping request of the application as a memory return request so as not to release the connection between the physical memory and virtual memory of the pre-mapped pages mapped previously but preserve the corresponding information in the reuse pool and provide, when the mapping request reoccurs, the application with the corresponding memory information retrieved from the reuse pool.

Referring to FIG. 9, the processes P1, P3, P5, P6, P4, and P8 denote the processes generated in order, and the blocks denote the memory mapping information.

In the present disclosure, the reuse pool of pre-mapped pages may be interchangeably referred to as memory mapping storage 900.

The memory mapping storage 900 may be established per process. In FIG. 9, the memory mapping storage 900 is established per process (P1, P3, P5, P6, P4, and P8), and each memory mapping storage 900 stores the information on the page mapped previously. In this case, the amount of the pages stored in the memory mapping storage, i.e. total capacity of the memory mapping storage 900 may vary depending on the physical memory. That is, the physical memory continues storing the memory mapping information until the physical memory exhausts, deletes, if the physical memory is full, the information in the first-in first-out manner, and releases the connection between the physical and virtual memories.

However, the above method may have a drawback of increasing the total memory usage amount and difficulty of securing free memory. Also, if the memory mapping storage 900 is full, the memory return request (RECLAIM/LOW MEMORY KILLER) occurs frequently so as to degrade the system performance.

Figure 10:
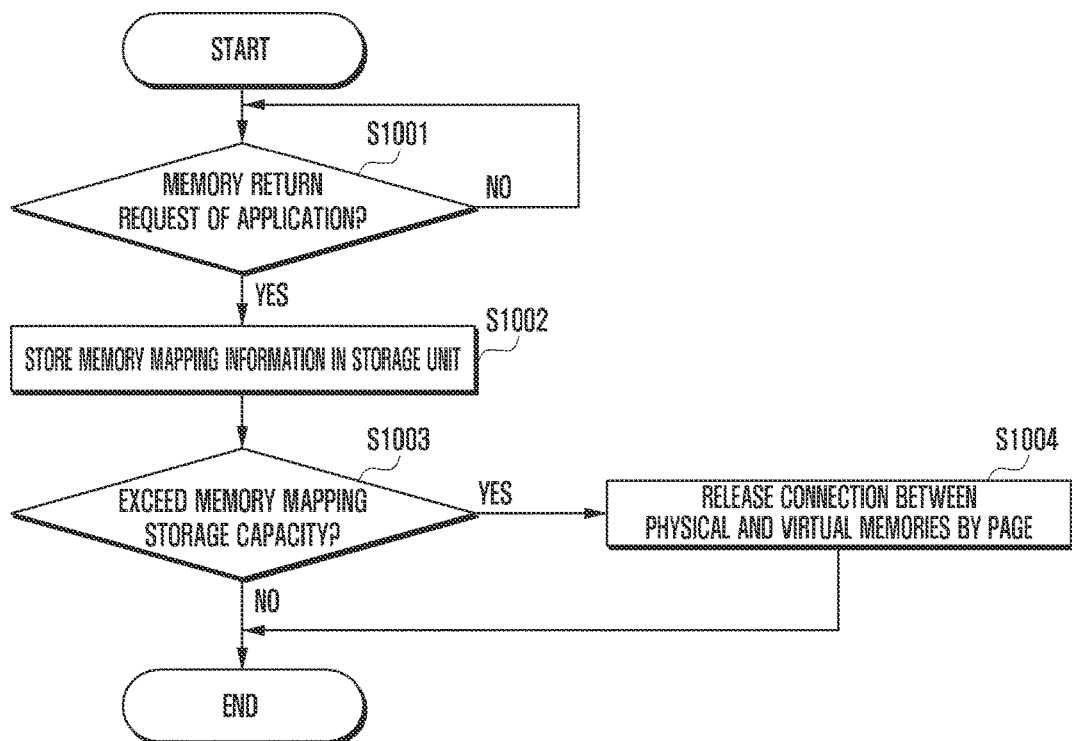
FIG. 10 is a flowchart illustrating a memory mapping storage management method according to an embodiment of the present disclosure.

FIG. 10 is a flowchart illustrating a memory mapping storage management method according to an embodiment of the present disclosure.

Referring to FIG. 10, the terminal determines whether an application requests for memory return at operation S1001. The terminal continues monitoring until a memory return request is detected.

If the memory return request is detected, the terminal stores the memory mapping information of the process corresponding to the memory return request in the memory mapping storage at operation S1002.

The terminal determines whether the total amount of the memory mapping information stored in the memory mapping storage exceeds a predetermined capacity at operation S1003. Unlike the memory mapping storage 900 of FIG. 9, the capacity of the memory mapping storage may be restricted in size.

According to an embodiment of the present disclosure, the memory mapping storage may be established as a common storage space in which the information is stored in the order of generation of the processes, unlike the memory mapping storage 900 of FIG. 9 which is established per process.

If the total amount of the memory mapping information exceeds the predetermined capacity, the terminal may discard the memory mapping information as much as the exceeded amount at operation S1004. At this time the exceeded amount may be deleted by page.

For the pages corresponding to the deleted mapping information, the connection between the physical and virtual memories may be released. This means that it is possible to secure the free memory as much as the deleted information.

Figure 11:
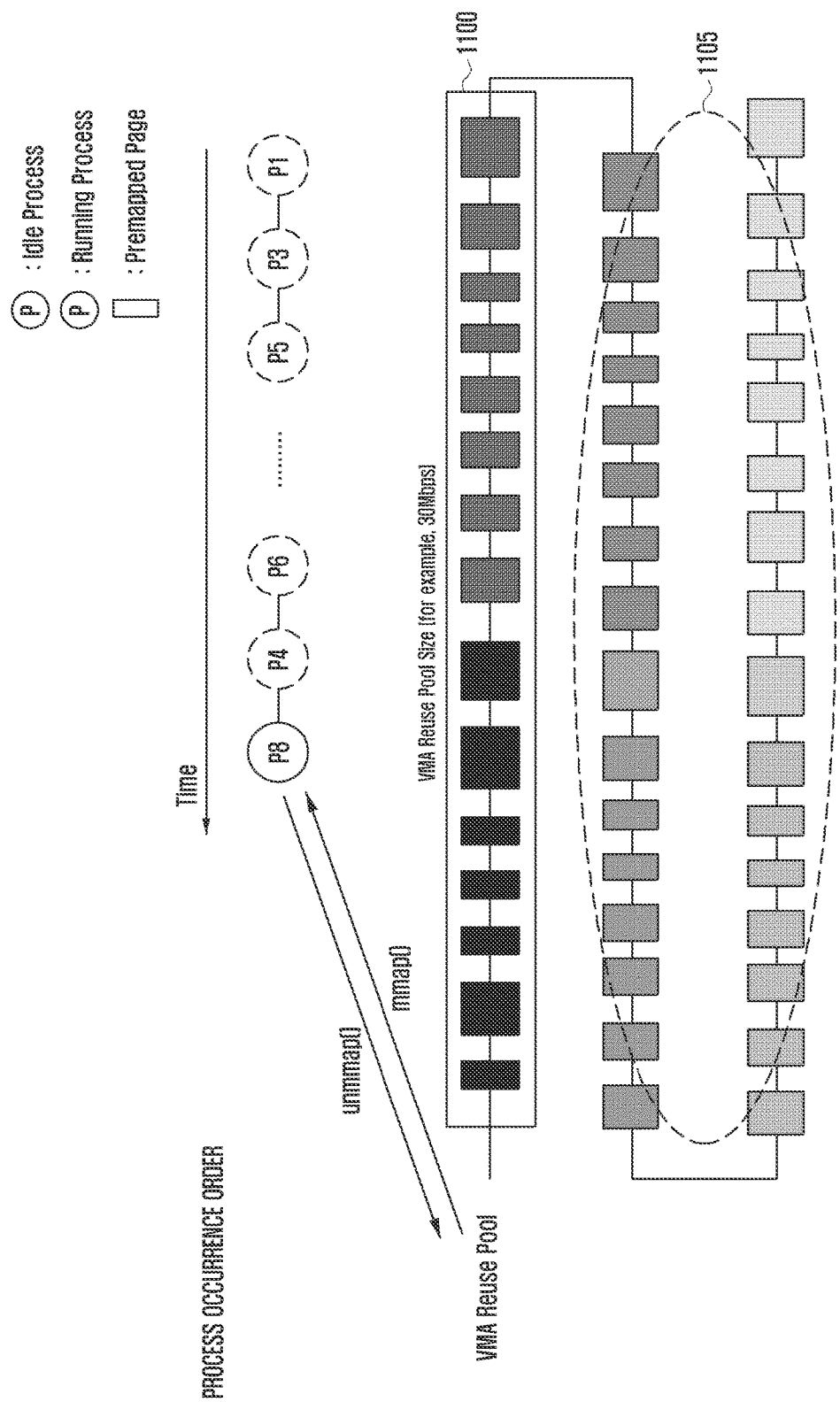
FIG. 11 is a diagram illustrating a memory mapping storage according to an embodiment of the present disclosure.

FIG. 11 is a diagram illustrating a memory mapping storage according to an embodiment of the present disclosure.

Referring to FIG. 11, the memory mapping storage 1100 is established as a common storage unit. Accordingly, the processes P1, P3, P5, P6, P4, and P8 are stored in the memory mapping storage 1100 in the order of generation thereof.

The memory mapping storage 1100 may be restricted in size. In the example of FIG. 11, the memory mapping storage 1100 is restricted to 30 MB. In this case, a part of the memory mapping information 1105 which exceeds 30 MB may be deleted from the memory mapping storage 1100. For the deleted memory mapping information 1105, the connection between the physical and virtual memories may be released.

Figure 12:
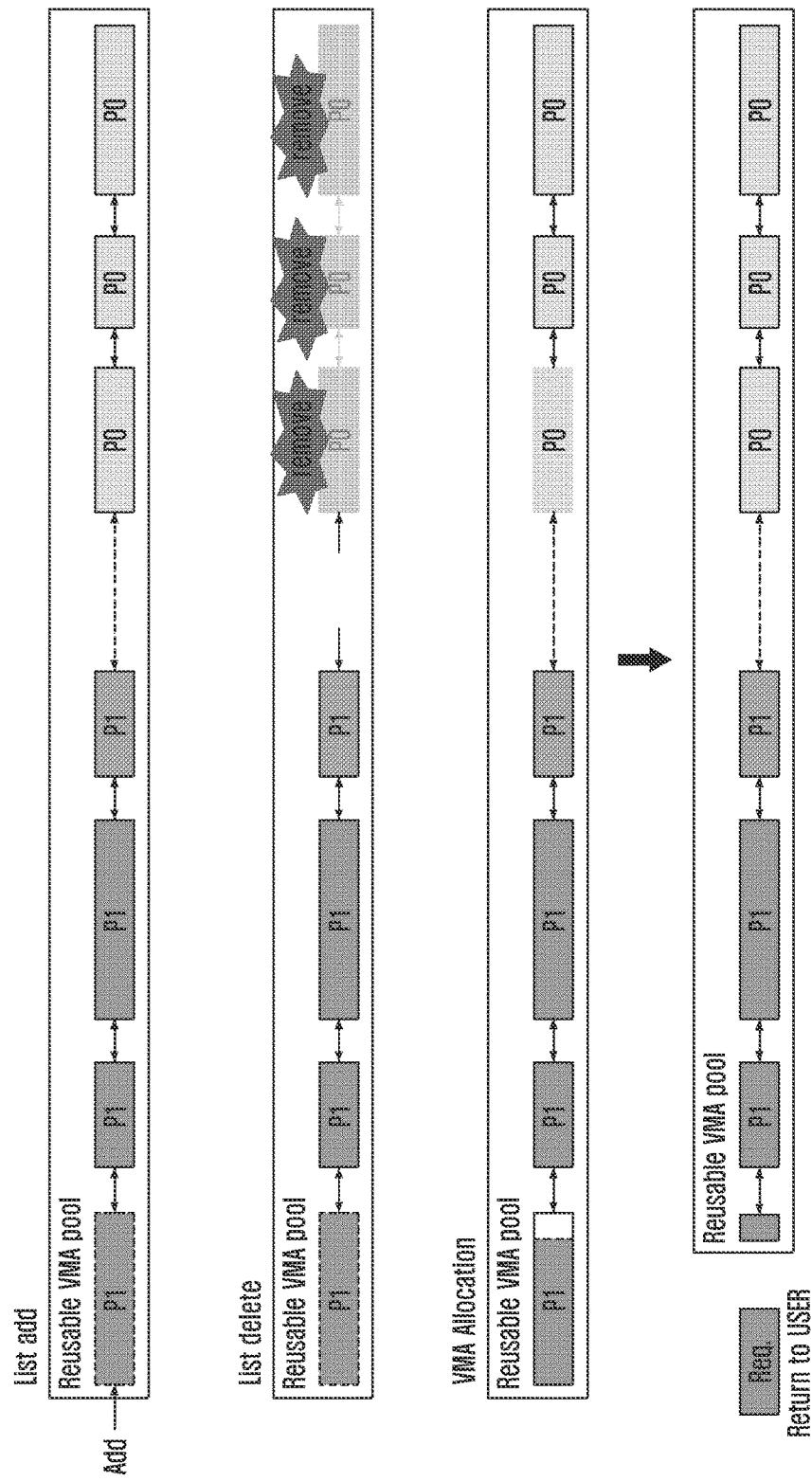
FIG. 12 is a diagram for explaining an operation of a memory mapping storage according to an embodiment of the present disclosure.

FIG. 12 is a diagram for explaining an operation of a memory mapping storage according to an embodiment of the present disclosure.

Referring to FIG. 12, "List add" denotes a process of detecting the memory return request from an application and adding the memory mapping information to the memory mapping storage.

"List delete" denotes a process of deleting, when the memory mapping information amount exceeds the predetermined capacity, the oldest memory mapping information list by page.

"VMA Allocation" denotes a process of providing, when a remapping request (mmap( )) is generated by an application for the mapping information stored in the memory mapping storage, the application with the memory mapping information on the request message as much as the requested size.

Figure 13:
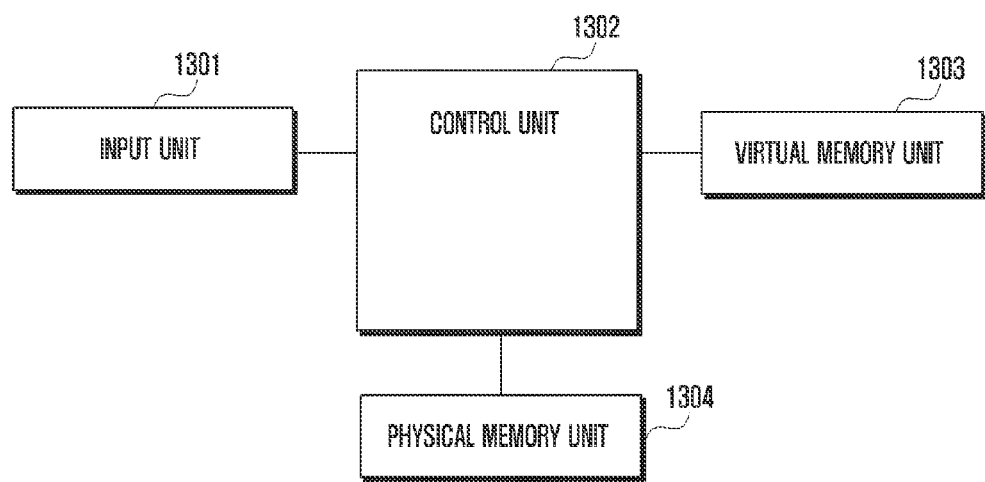
FIG. 13 is a block diagram illustrating a configuration of an application execution apparatus according to an embodiment of the present disclosure.

FIG. 13 is a block diagram illustrating a configuration of an application execution apparatus according to an embodiment of the present disclosure.

Referring to FIG. 13, the application execution apparatus according to an embodiment of the present disclosure includes an input unit 1301, a control unit 1302, a virtual memory unit 1303, and a physical memory unit 1304.

The physical memory unit 1304 may be a real memory for storing data but is not limited thereto.

The input unit 1301 may generate a request signal such as the mapping and un-mapping request in response to an input made to an application.

The virtual memory unit 1303 may map the data stored in the physical memory unit 1304. The application may access the virtual memory unit 1303 to read data from the physical memory unit 1304.

Although not depicted in the drawing, the control unit 1302 may include a memory mapping storage for storing the memory mapping information of the process corresponding to the memory return request input through the input unit 1301.

The control unit 1302 determines whether the total memory mapping information stored in the memory mapping storage exceeds a predetermined capacity and, if so, deletes at least one memory mapping information by page to release the connection between the virtual and physical memory units.

The control unit 1302 also may delete at least one memory mapping information from the memory mapping storage and release the connection between the virtual and physical memories in units of page.

If the application requests for at least one of the memory mapping information stored in the memory mapping storage, the control unit 1302 may send the memory mapping information as much as requested to the application.

As described above, the predetermined capacity may be equal to or less than the size of the physical memory.

Although the structure of the application execution apparatus is described schematically, it is obvious to those in the art that the components may be subdivided into a plurality of modules or merged into at least one module.

According to various embodiments of FIGS. 4 to 8, in the case that the profile data storing a list of the requested I/O exists, it is possible to improve the application launching speed by preloading the corresponding I/Os.

From the viewpoint of the system, the entire system performance may be influenced by the size of the memory headroom. In more detail, if preloading the profile data for improving the application launching speed is performed with insufficient memory headroom, this may degrade the system performance instead.

Accordingly, an embodiment of the present disclosure proposes an adaptive loading method that is capable of pre-loading the profile data in adaptation to the current status of the memory. That is, the terminal loads all the profile data when the extra memory is large enough (high free memory) and reduces the data amount to be loaded as the memory headroom level decreases.

The data to be loaded may be selected by the process generating the data, the related service (process) having large amount of profile data is excluded as the memory headroom decreases, and only the profile data generated by the target application are loaded at a low memory level (low free memory). The memory level is determined by threshold values which may vary depending on the system memory size.

An adaptive loading method is described hereinafter with reference to FIGS. 13 and 14.

Figure 14:
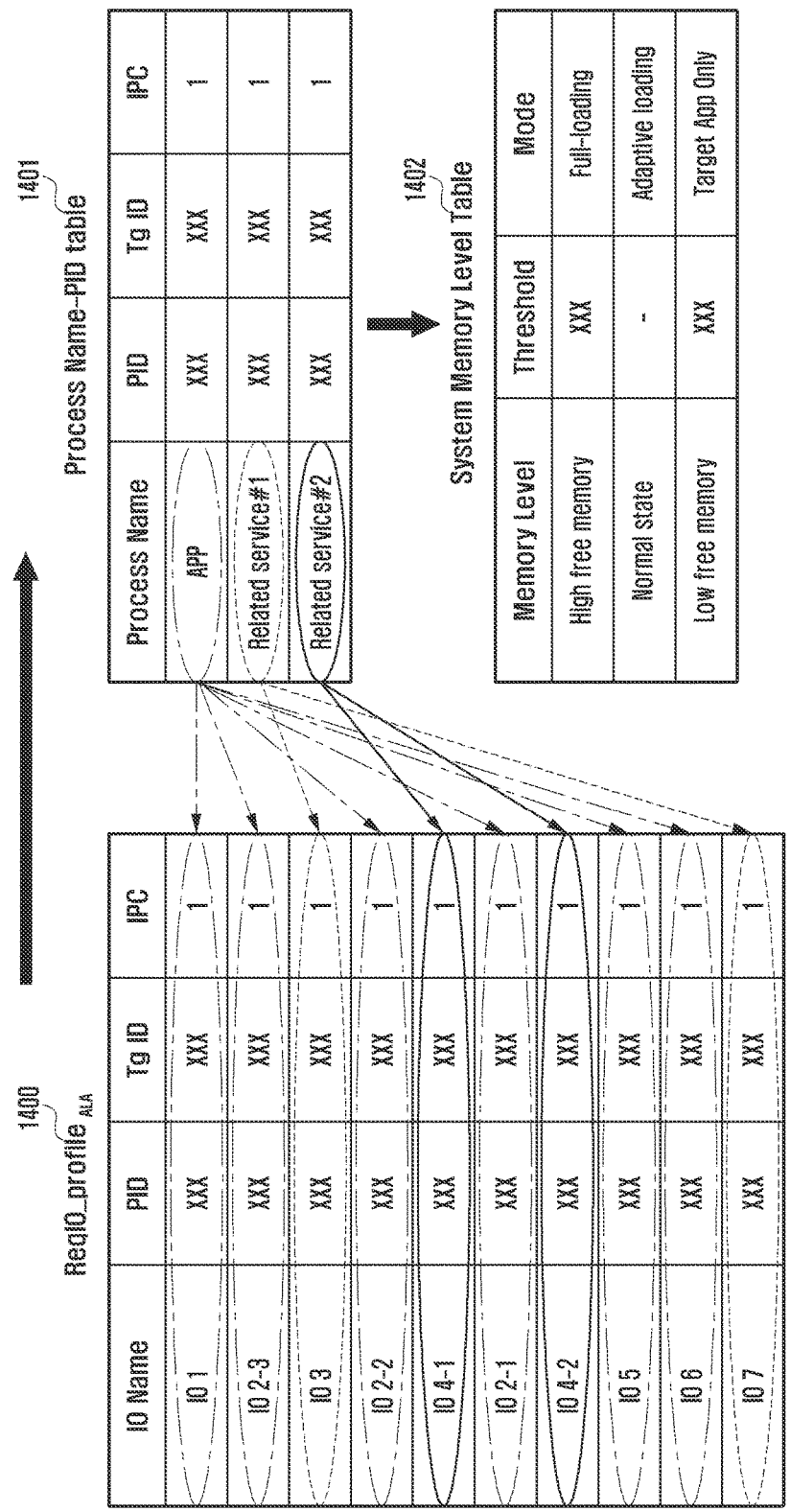
FIG. 14 is a diagram for explaining an adaptive loading method according to an embodiment of the present disclosure.

FIG. 14 is a diagram for explaining an adaptive loading method according to an embodiment of the present disclosure.

Referring to FIG. 14, reference number 1400 denotes a list of the requested I/Os contained in the profile data. A plurality of processes may generate the I/Os for the target application. Here, the Process Identification (PID) is a value that changes whenever the profile data are generated or the terminal reboots and thus it is difficult to know the process generating the corresponding I/O process only based on the PID value.

Reference number 1401 denotes a table of PIDs mapped to the names of the processes generating the I/Os. By referencing the table, it is possible to know the name of process which has generated the I/O using the PID.

That is, the I/Os (IO1,IO2-1,IO2-2,IO2-3,IO5,IO6) are the I/Os generated by the target application, and the I/Os (IO4-1,IO4-2) and (IO3,IO7) are I/Os generated by the related service #1 and related service #2 respectively. The table mapping the PIDs and process names may be stored in the terminal and updated when the application is installed, deleted, or modified.

Meanwhile, reference number 1402 denotes a table mapping the system memory levels and operation modes of the adaptive loading method according to an embodiment of the present disclosure.

By referencing the table 1402, it is possible to determine the system memory level based on predetermined threshold values. Although FIG. 14 is directed to the case where the memory level is determined depending on the amount of the free memory, the memory level may be determined based on the memory amount in use. The threshold values may change depending on the system memory size.

There are two threshold values, i.e. low threshold value and high threshold value, in the table 1402.

If the free memory amount is less than the low threshold value, this means that the available memory resource is very small and the terminal determines that the current memory level is the low free memory level. In this case, the terminal may preload only the I/Os generated by target application selectively (Target App Only Mode.

If the free memory amount is greater than the high threshold value, this means that the available memory resource is large and thus the terminal determines that the current memory level is the high free memory level. In this case, because the memory resource is large enough, the terminal may operate in the full-loading mode in which all of the I/Os contained in the profile data can be preloaded.

Finally, if the free memory amount is in the range between the low and high threshold values, the terminal determines that the current memory level is the normal state and, in this case, selects the I/Os to be pre-loaded differently among the profile data according to the free memory ratio. Assuming that the high and low threshold values are 80% and 20% respectively, the I/Os to be preloaded are selected in proportion to the free memory amount, e.g., differently when the free memory amount is 50% and 30%.

Although the description is directed to the case where the three memory levels are defined with two threshold values for the different pre-loading modes, it is also possible to preload only the I/Os corresponding to the profile data as much as the ratio of the free memory amount to the entire profile data according to the free memory amount without threshold values.

Figure 15:
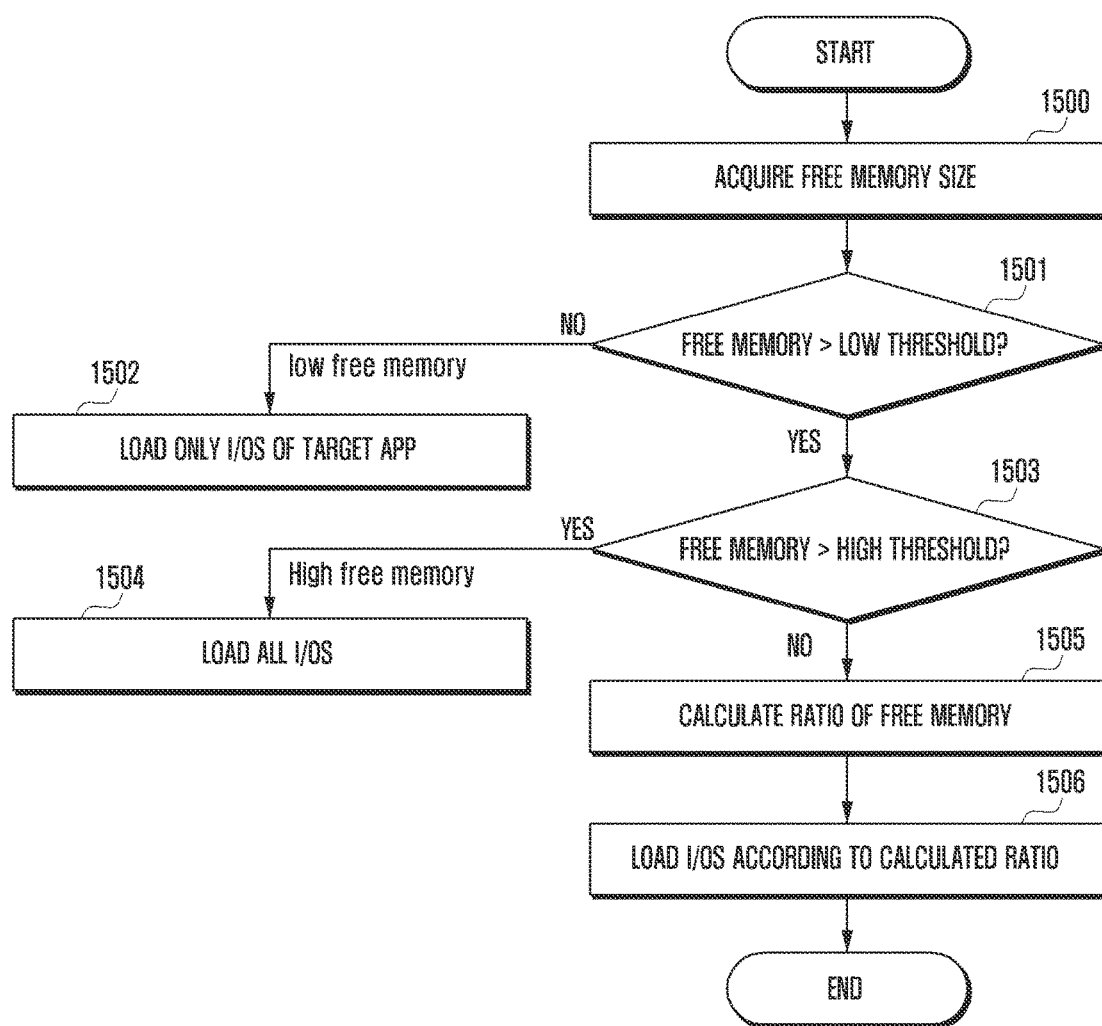
FIG. 15 is a flowchart illustrating an adaptive loading operation according to an embodiment of the present disclosure.

FIG. 15 is a flowchart illustrating an adaptive loading operation according to an embodiment of the present disclosure.

Referring to FIG. 15, the terminal checks the free memory size at operation 1500. Although not shown in the drawing, the terminal determines the memory level to acquire the free memory size whenever the application is launched.

The terminal determines whether the free memory size is greater than the low threshold at operation 1501. If the free memory size is equal to or less than the low threshold value, the terminal determines that the memory state is low free memory level and preloads only the I/Os generated by the target application at operation 1502.

If the free memory size is greater than the low threshold value, the terminal determines whether the free memory size is greater than the high threshold value at operation 1503. If the free memory size is greater than the high threshold value, this means that the free memory is large enough and thus the terminal determines that the memory state is high free memory level so as to preload all of the I/Os included in the profile data at operation 1504.

If the free memory size is equal to or less than the high threshold value, the terminal determines that the memory state is the normal state level and calculates the radio of the free memory to the entire memory at operation 1505.

At operation 1506, the terminal preloads the I/Os included in the profile data according to the ratio calculated at operation 1505.

As described above, the application execution method and apparatus of the present disclosure is advantageous in terms of improving the launching speed in the case of re-launching the application by updating all I/O data requested at the application launching stage of the terminal to profile data.

Also, the application execution method and apparatus of the present disclosure is advantageous in terms of reducing the I/O pre-loading time on the profile data by merging the I/O, if possible, in updating the profile data.

Also, the application execution method and apparatus of the present disclosure is advantageous in terms of mitigating memory performance degradation by determining whether to pre-load the I/O depending on the virtual memory status and the number of I/Os to be loaded.

Furthermore, the application execution method and apparatus of the present disclosure is advantageous in terms of securing enough free memory space by using a predetermined capacity of reuse storage when a memory return request occurs while the application is running.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for application execution of a terminal, the method comprising:
   detecting a launch of an application;
   preloading Input/Outputs (I/Os) requested at the launch of the application based on profile data with I/Os requested at a previous launch of the application;
   determining whether the I/Os requested at the launch of the application are related to the launch of the application; and
   adding the I/Os to the profile data, in case that the I/Os are related to the launch of the application, and updating the profile data,
   wherein the updating of the profile data comprises:
      determining whether the I/Os associated with a same file are within a time range preconfigured for merging, and
      merging the I/Os associated with the same file, in case that the I/Os associated with the same file are within the time range.

2. The method of claim 1, wherein the updating of the profile data further comprises:
   determining whether the I/Os requested at the launch of the application exist in the profile data; and adding the I/Os to the profile data, in case that the I/Os do not exist in the profile data.

3. The method of claim 1, wherein the determining of whether the I/Os requested at the launch of the application are related to the launch of the application comprises:
determining whether an Inter-Processor Communication occurs between the I/Os requested at the launch of the application and the I/Os stored in the profile data.

4. The method of claim 1, wherein the updating of the profile data further comprises:
determining the I/Os to be included in the profile data;
extracting the I/Os associated with the same file among the I/Os to be included in the profile data; and
determining whether the I/Os associated with the same file are within the time range.

5. The method of claim 1, further comprising:
after the detecting of the launch of the application, checking a memory state of the terminal.

6. The method of claim 5, wherein the checking of the memory state comprises:
determining that the memory state is a low memory level at which the terminal preloads only the Input/Outputs (I/Os) requested by the application among the I/Os included in the profile data, in case that a free memory amount of the terminal is less than a first threshold.

7. The method of claim 5, wherein the checking of the memory state comprises:
determining that the memory state is a high memory level at which the terminal preloads all of the I/Os included in the profile data, in case that a free memory amount of the terminal is greater than a second threshold.

8. The method of claim 5, wherein the checking of the memory state comprises:
determining that the memory state is a normal memory level at which the terminal preloads the I/Os in proportion to a ratio of the free memory amount to whole memory size among the I/Os included in the profile data, in case that a free memory amount of the terminal is in a range between a first threshold and a second threshold.

9. A terminal for executing an application, the terminal comprising:
a storage for storing profile data including a list of Input/Outputs (I/Os) requested at a previous launch of the application; and
at least one processor configured to:
detect a launch of the application,
preload I/Os requested at the launch of the application based on profile data with I/Os requested at the previous launch of the application,
determine whether the I/Os requested at the launch of the application are related to the launch of the application,
add the I/Os to the profile data, in case that the I/Os are related to the launch of the application, and
update the profile data,
wherein, to update the profile data, the at least one processor is further configured to:
determine whether the I/Os associated with a same file are within a time range preconfigured for merging, and
merge the I/Os associated with the same file, in case that the I/Os associated with the same file are within the time range.

10. The terminal of claim 9, wherein, to further update the profile data, the at least one processor is further configured to:
determine whether the I/Os requested at the launch of the application exist in the profile data; and
add the I/Os to the profile data, in case that the I/Os do not exist in the profile data.

11. The terminal of claim 9, wherein, to determine whether the I/Os requested at the launch of the application are related to the launch of the application, the at least one processor is further configured to:
determine whether an Inter-Processor Communication occurs between the I/Os requested at the launch of the application and the I/Os stored in the profile data.

12. The terminal of claim 9, wherein, to further update the profile data, the at least one processor is further configured to:
determine the I/Os to be included in the profile data;
extract the I/Os associated with the same file among the I/Os to be included in the profile data; and
determine whether the I/Os associated with the same file are within the time range.

13. The terminal of claim 9, wherein the at least one processor is further configured to:
after the launch of the application is detected, check a memory state of the terminal.

14. The terminal of claim 13, wherein, to check the memory state of the terminal, the at least one processor is further configured to:
determine that the memory state is a low memory level at which the terminal preloads only the I/Os requested by the application among the I/Os included in the profile data, in case that a free memory amount of the terminal is less than a first threshold.

15. The terminal of claim 13, wherein, to check the memory state of the terminal, the at least one processor is further configured to:
determine that the memory state is a high memory level at which the terminal preloads all of the I/Os included in the profile data, in case that a free memory amount of the terminal is greater than a second threshold.

16. The terminal of claim 13, wherein, to check the memory state of the terminal, the at least one processor is further configured to:
determine that the memory state is a normal memory level at which the terminal preloads the I/Os in proportion to a ratio of the free memory amount to whole memory size among the I/Os included in the profile data, in case that a free memory amount of the terminal is in a range between a first threshold and a second threshold.

* * * * *